Figure 1:
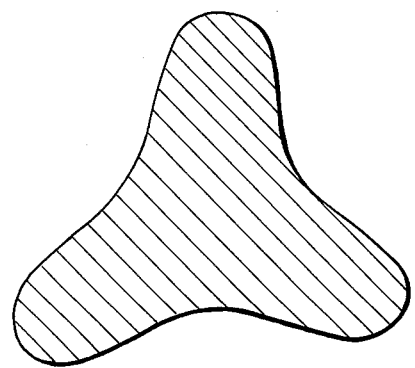

United States Patent [19]

Turbak et al.

[11] 4,076,933

[45] Feb. 28, 1978

[54] PROCESS FOR PRODUCING A REGENERATED SHAPED CELLULOSIC FIBER

[75] Inventors: Albin Frank Turbak, Convent Station; Richard Benjamin Hammer, Morris Plains; Norman A. Portnoy, Hopatcong, all of N.J.; Arthur C. West, St. Paul, Minn.

[73] Assignee: International Telephone and Telegraph Corporation, New York, N.Y.

[21] Appl. No.: 662,138

[22] Filed: Feb. 27, 1976

[51] Int. Cl.² ............................................. C08B 16/00
[52] U.S. Cl. ..................................... 536/30; 264/183; 264/187; 264/188; 428/397; 536/35; 536/57
[58] Field of Search ....................... 536/30, 32, 35, 57; 428/397; 264/183, 187, 188

[56] References Cited

U.S. PATENT DOCUMENTS

| | | | |
|---|---|---|---|
| 1,773,969 | 8/1930 | Dreyfus et al. | 264/177 F |
| 2,472,591 | 6/1949 | Kenyon et al. | 536/35 |
| 3,087,775 | 4/1963 | Reinhardt et al. | 536/30 |
| 3,236,669 | 2/1966 | Williams | 536/57 |
| 3,702,843 | 11/1972 | Schweiger | 536/35 |

FOREIGN PATENT DOCUMENTS

| | | | |
|---|---|---|---|
| 786,225 | 5/1968 | Canada | 536/30 |
| 876,148 | 7/1971 | Canada | 536/30 |
| 899,559 | 5/1972 | Canada | 536/30 |

OTHER PUBLICATIONS

Chemical Engineering, Jul. 19, 1965, p. 43.
Journal of Applied Polymer Science, vol. 18, 1974, pp. 133–142, article by Venkateswaran et al.

*Primary Examiner*—Ronald W. Griffin
*Attorney, Agent, or Firm*—J. B. Raden; H. J. Holt

[57] ABSTRACT

Shaped cellulosic fibers are produced by nitrosating and dissolving a cellulosic material in an aprotic solvent selected from the group consisting of a dialkylacylamide and dimethylsulfoxide and regenerating the dissolved cellulose by contacting the cellulose solution with a regenerant. The regenerant is butanol, pentanol or benzyl alcohol where the solvent is a dialkylacylamide and propanol, butanol or benzyl alcohol where the solvent is dimethylsulfoxide. The fibers have a generally crenulated shape as regenerated and require no special spinnerette designs nor special spinning conditions.

12 Claims, 2 Drawing Figures

PROCESS FOR PRODUCING A REGENERATED SHAPED CELLULOSIC FIBER

This invention relates to a process for producing a regenerated shaped cellulosic fiber and to the fibers produced therefrom.

The use of organic solvent systems for dissolving cellulose and producing regenerated cellulosic products is known. One such organic solvent system having considerable promise consists of a dimethylformamide solvent and dinitrogen tetroxide as a nitriting or nitrosating agent. In such a system, the cellulose is regenerated from the organic solvent by contact with a non-solvent for the cellulose such as water or a lower alcohol. Such a system is shown, for example, in Canadian Pat. No. 899,559, which issued on May 9, 1972. The literature has also reported the use of dimethylsulfoxide and nitrogen dioxide as a solvent for cellulose and its regeneration from aqueous mediums containing a variety of salts or organic liquids including lower alcohols. See, for example, U.S. Pat. No. 3,236,669 and Canadian Pat. No. 786,225. However, the prior art contains essentially no disclosure of fiber properties or configurations nor does the prior art disclose processes for controlling the cross-sectional configuration of fibers obtained from these organic solvent systems.

It is known that shaped filaments may be produced from non-cellulosics using melt spinning techniques with specially shaped spinnerettes. Cellulosic fibers — viscose and acetate — with hollow or other irregular cross-sections have been reportedly produced by the addition of low boiling solvents or gas producing materials to either the cellulosic solutions or to the spin baths, by adjusting the spinning conditions or by the use of special spinnerette designs. To our knowledge, no one has, however, prepared fibers of pure cellulose which are shaped in cross-sectional configuration solely by control of the coagulation-regeneration system and without the necessity of modifiers or special spinnerettes or special spinning techniques.

It is accordingly a primary object of the present invention to provide a process for producing shaped regenerated cellulosic fibers.

It is an additional object of this invention to provide a process for producing regenerated shaped cellulosic fibers by a process which does not use or require special spinnerettes, special spinning techniques or additional process modifications beyond those normally used for fibers or normal configuration.

It is a further object of this invention to provide a regenerated cellulosic fiber having a crenulated shape.

It has been found that shaped fibers may be produced by spinning an organic solvent/cellulosic solution into certain regenerants, butanol, pentanol or benzyl alcohol where the solvent is a dialkylacylamide, and propanol, butanol or benzyl alcohol where the solvent is dimethylsulfoxide. The configuration is believed due to control of the reactivity and diffusibility of the coagulant (which is also the regenerant) by the initially formed skin of the solvent spun fiber and is totally unexpected in view of prior experience in this field. Other homologous alcoholic coagulants do not produce shaped fibers. For the most part, the fibers of the present invention are crenulated — that is the fibers exhibit, in cross-section, an outer irregular or scalloped configuration. The term "shaped" as used herein, is intended to identify such solid, non-round fiber configurations.

Figure 2:
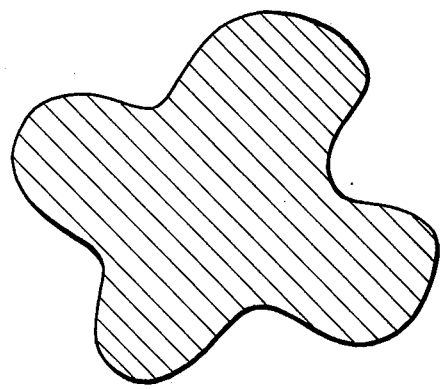

The invention will be better understood from the following description taken in connection with the accompanying drawing in which FIGS. 1 and 2 are greatly enlarged cross-sectional views of fibers produced in accordance with the invention.

While the specific configuration or shape of fibers produced in accordance with the invention may vary, they may be typically described as multilobal or crenulated and two such crenulated fibers are illustrated in the drawing. The amount of crenulation can be controlled by the choice of solvent-regenerant system. Thus, the generally trilobal cross-section of FIG. 1 may be obtained from a dimethylformamide solvent and an isoamyl alcohol coagulant or from a dimethylsulfoxide solvent and an isopropanol, butanol or benzyl alcohol coagulant. The cross-sectional shape of FIG. 2 which is roughly quadrilobal or X-shaped may be obtained from a dimethylformamide solvent and either an isobutanol or a benzyl alcohol coagulant. Such shaped fibers have a number of uses. For example, yarns prepared from fibers having these various modified cross-sections are bulkier and display superior covering power when converted to knit or woven fabrics as compared to regular circular cross-section fibers. Non-woven structures prepared from fibers of these modified cross-sections display superior bulk, resilience and absorbency as compared to regular circular fibers.

Alcohols useful as coagulants in the invention are propanol, butanol, pentanol and benzyl alcohol including the various isomers of these alcohols such as isopropanol, butanol-1, butanol-2, isobutanol, pentanol-1, pentanol-2, pentanol-3 and primary and secondary isoamyl alcohol. In general, the dialkylacylamide solvent, and particularly dimethylformamide (DMF), produces fibers of best properties and the latter solvents are therefore preferred. Shaped fibers produced from DMF solvents in accordance with the present invention have been found to have essentially the same strength as fibers spun from a similar organic solvent system but utilizing a coagulant which produces normal round fiber. It appears that the fiber shapes of the present invention result at least in part from a combination of a slower removal of the cellulose solvent in the higher alcohol coagulant coupled with a modified rate of penetration of the higher alcohol through the initially formed fiber skin.

In the practice of the invention, the cellulosic material is first nitrosated and dissolved in an aprotic solvent. This may be done by adding the cellulose material to the solvent and then feeding nitrogen dioxide, or its dimer, dinitrogen tetroxide, into the mixture while stirring and preferably while cooling. Alternatively, the nitrosating agent is mixed with the solvent and the cellulose then added. Analytical studies have indicated that the process of dissolution involves a reaction of nitrogen dioxide or other nitrosating agent with cellulose to form a solvent soluble cellulose nitrite ester. Where the solvent is dimethylsulfoxide, dissolution is assisted by the presence of from 0.6 to 0.8% water.

Where the aprotic solvent is a dialkylacylamide, it may be N,N-dimethylformamide (DMF) or N,N-dimethyl- or N,N-diethylacetamide. The solvent should be capable of dissolving the nitrited cellulose without substantial depolymerization of the cellulose.

A wide variety of cellulosic sources may be used such as chemical pulps, either sulfite or kraft, bleached or unbleached. Cotton linters, reprocessed cellulose and purified bast fibers are other typical sources of cellulose. About 5 to 14 grams of cellulose for 100 grams of solution should typically be used, preferably from 6 to 12 grams per 100 grams of solution. The concentrations will vary with the degree of polymerization (DP) of the cellulose, lower concentrations being used for higher DP's. The cellulosic pulp will normally vary from 250 to 1000 DP, a range of 300 to 800 being preferred.

The nitrosating agent is normally used in stoichiometric excess. The nitrosyl group is preferably added as $NO_2$ or its dimer $N_2O_4$, but may also be other oxides such as $N_2O_3$ or $N_2O_5$ or other nitrosating species such as nitrosyl chloride. Slightly greater than 3 moles of the nitrosating agent should be added per mole of anhydroglucose unit in the cellulose.

To obtain lowest caustic extractability properties in the fibers — a desirable goal to avoid damage during normal alkaline laundering or mercerizing of cellulosic fabrics — the nitrosating agent should preferably be added and dissolution should occur at a temperature below about 20° C and the storage time subsequent to dissolution and prior to coagulation or regeneration should be as brief as possible and before any significant oxidation of the cellulose takes place. In the case of a dialkylacylamide as the aprotic solvent, the temperature of dissolution should be no greater than 20° C and preferably less than 10° C. Where the aprotic solvent is dimethylsulfoxide, the $N_2O_4$ is preferably premixed with the dimethylsulfoxide to lower the freezing temperature of the latter. The temperature is then reduced to 20° C or less, preferably about 9° C, and the cellulose added, again maintaining the temperature below 20° C during dissolution of the cellulose. Reference to a more complete description of this aspect of the process with respect to dialkylacylamide solvents may be found in co-pending application Ser. No. 662,132, filed of even date herewith.

The addition of a base to the regenerant which is soluble in the regenerant and reactive with the nitric acid introduced into the regenerant during coagulation and regeneration, also may improve caustic extractability properties. The base may be added in amounts ranging up to 25% by weight of the regenerant, preferably from about 5-15% by weight. Examples of useful reactive bases which are soluble in the alcohol coagulants are the corresponding alkoxides produced by addition of an alkali or alkaline earth metal into an excess of the respective alcohol. Also useful are soluble oxides and hydroxides of the alkali and alkaline earth metals.

The solution will normally be spun into a primary coagulation bath, the coagulated fiber passed to a primary godet, then through a secondary bath to a secondary godet, whose speed can be altered to produce the desired degree of stretch. Additional godets and/or coagulant baths may be used to introduce further stretch and complete the regeneration. The alcohol coagulants of the invention are used for both coagulation and ultimate regeneration of the fibers. Where more than a single bath is used, the bath may consist of the same or different coagulants and the secondary bath may be aqueous. Unless otherwise indicated, reference herein to the coagulant or regenerant identifies the primary bath.

The following examples are illustrative of the practice of the invention. Unless otherwise indicated, all parts are by weight.

EXAMPLE 1

A prehydrolyzed kraft pulp having a DP of 1050 was alkaline aged to a DP level of 450, neutralized, washed, dried, then fluffed and defibered by means of a rotary cutter. An 8/25/67 cellulose solution containing 8 parts of cellulose, 25 parts of $N_2O_4$ and 67 parts of DMF was prepared by charging 160 grams of the alkali aged prehydrolyzed kraft pulp (DP 450) and 1340 grams of dimethylformamide (DMF) into a two-liter four neck resin reaction flask equipped with a stainless-steel mechanical stirrer, thermometer, and a 250 ml equalizing pressure addition funnel. The resulting slurry was stirred and 500 grams of liquid nitrogen tetroxide ($N_2O_4$) was added dropwise over ca. 60 minute time period. The solution was deaerated and vertically spun using a glass 300 hole (0.0025 inch) spinnerette. The fiber tow was passed through a primary bath of isoamyl alcohol (2-methyl-butanol-4) at 15° C, then through a secondary bath of water at 22° C. The fiber tow was cut from the take up godet, cut into staple fiber lengths, neutralized with bicarbonate, washed with water, finished with a 0.3% lubricating finish, air dried and carded. Godet stretch was 60% (As used in this and the following examples, godet stretch is the difference between the circumferential speed of the intial and final godet, divided by the speed of the initial godet, times 100). The fibers produced had a trilobal cross-section of the type shown in FIG. 1. The fibers had tenacities of 2.74 g/d (cond.) and 1.23 g/d (wet), elongations of 6.94% (cond.) and 10.15% (wet) for a 0.90 denier filament of 0.54 g/d wet modulus.

EXAMPLE 2

The process of Example 1 was repeated using however a primary bath coagulant of benzyl alcohol at 15° C. The fibers were largely quadrilobal of the general type shown in FIG. 2 of the drawing. Properties were as follows:

| Tenacity | (cond.) | 1.94 g/d |
| | (wet) | 0.97 g/d |
| Elongation | (cond.) | 7.68% |
| | (wet) | 12.17% |
| Wet Modulus | | 0.41 g/d |
| Denier | | 0.96 |

EXAMPLE 3

The process of Example 1 was again repeated using an 8/15/77 cellulose /$N_2O_4$/DMF solution and a primary bath of iso-butanol containing 10% by weight of sodium methoxide. The fibers had an X-shaped cross-section similar to that of Example 2. Fiber properties were as follows:

| Tenacity | (cond.) | 2.08 g/d |
| | (wet) | 1.26 g/d |
| Elongation | (cond.) | 6.10% |
| | (wet) | 12.20% |
| Wet Modulus | | 0.54 g/d |
| Denier | | 1.08 |

EXAMPLE 4

Fibers were prepared as in the previous examples from an 8/15/77 cellulose/$N_2O_4$/DMF solution and an iso-amyl alcohol primary coagulant bath at 20° C. The fibers were trilobal in cross-sectional shape.

EXAMPLE 5

Example 4 was repeated using 10% of sodium isopentoxide in the coagulant. The fibers were again trilobal. The properties of the fibers of Examples 4 and 5 were as follows:

|  |  | Example 4 | Example 5 |
|---|---|---|---|
| Tenacity | (Cond.) | 2.19 g/d | 2.31 g/d |
|  | (wet) | 1.19 g/d | 1.18 g/d |
| Elongation | (cond.) | 10.92% | 9.86% |
|  | (wet) | 20.90% | 14.24% |
| Wet Modulus |  | 0.31 g/d | 0.38 g/d |
| Denier |  | 1.28 | 0.75 |

EXAMPLE 6

An 8/15/77 cellulose solution was prepared from 80 grams of prehydrolyzed kraft pulp aged to a DP of 450 and containing 0.6–0.7% water, 150 grams of $N_2O_4$, 770 grams of dimethylsulfoxide (DMSO) and 1.50 grams of water. The liquid $N_2O_4$ was added to the DMSO, then the water and finally the cellulose. This was stirred at 20° C for 16 hours to give a clear viscous solution. The solution was deaerated under vacuum and spun with a 300 hole glass spinnerette with 0.0025 inch hole size into an isopropanol primary bath. The tow was spun vertically from the primary coagulation bath at ambient temperature. A water secondary bath was located between the primary and secondary godet and maintained at 20° C. All fibers were processed as staple with 95° C. 6% $NaHCO_3$, rinsed with 50° C. water, 0.3% lubricating finish at 50° C., centrifuged, oven-dried at 100° C. and carded. Godet stretch was 58.9% and 81.7%. All fibers were trilobal in shape. Properties were as follows:

|  |  | % Stretch | |
|---|---|---|---|
|  |  | 58.9 | 81.7 |
| Tenacity | (cond.) | 1.77 | 1.89 g/d |
|  | (wet) | 0.93 | 0.92 g/d |
| Elongation | (cond.) | 6.2 | 6.5% |
|  | (wet) | 11.4 | 6.8% |
| Wet Modulus |  | 0.48 | 0.61 g/d |
| Denier |  | 0.59 | 0.62 |

EXAMPLES 7 AND 8

Example 6 was repeated using benzyl alcohol (Example 7) and n-butanol (Example 8) as the primary coagulant bath. Godet stretch was 71.2% for Example 7 and 62.1% for Example 8. The fibers in both instances were trilobal and had the following properties;

|  |  | Example 7 | Example 8 |
|---|---|---|---|
| Tenacity | (cond.) | 1.97 | 1.44 g/d |
|  | (wet) | 0.73 | 0.83 g/d |
| Elongation | (cond.) | 3.9 | 3.1% |
|  | (wet) | 6.4 | 6.8% |

-continued

|  | Example 7 | Example 8 |
|---|---|---|
| Wet Modulus | 0.57 | 0.70 g/d |
| Denier | 0.52 | 0.50 |

The cellulosic fibers of this invention have in common their irregular or crenulated cross-sectional shape and, in addition, the fact that they are solid. Hollow cellulosic fibers may also be produced from organic solvent systems and such fibers and their preparation are the subject of our copending application Ser. No. 662,134, filed of even date herewith.

What is claimed is:

1. A process for producing a regenerated shaped cellulosic fiber comprising nitrosating cellulose with a nitrosating agent selected from the group consisting of an oxide of nitrogen and nitrosyl chloride and dissolving the cellulose in an aprotic solvent selected from the group consisting of a dialkylacylamide and dimethylsulfoxide and regenerating the dissolved cellulose by spinning the cellulosic solution into a regenerant, said regenerant being selected from the group consisting of butanol, pentanol and benzyl alcohol, where the solvent is a dialkylacylamide and from the group consisting of propanol, butanol and benzyl alcohol where the solvent is dimethylsulfoxide, said regenerated fiber being trilobal or quadrilobal in cross-sectional shape as a result of the use of said regenerants.

2. The process of claim 1 in which the solvent is a dialkylacylamide and the regenerant is selected from the group consisting of butanol, pentanol and benzyl alcohol.

3. The process of claim 2 in which the pentanol regenerant is 2-methyl-butanol-4.

4. The process of claim 2 in which the regenerant is benzyl alcohol.

5. The process of claim 2 in which the solvent is dimethylformamide.

6. The process of claim 2 in which a base is added to the regenerant which is soluble in the regenerant and reactive with nitric acid introduced therein during regeneration.

7. The process of claim 1 in which the solvent is dimethylsulfoxide and the regenerant is selected from the group consisting of propanol, butanol and benzyl alcohol.

8. The process of claim 7 in which the regenerant is isopropanol.

9. The process of claim 7 in which the regenerant is butanol.

10. The process of claim 7 in which the regenerant is benzyl alcohol.

11. The process of claim 7 in which the nitrosating agent is premixed with the solvent, the temperature lowered to below 20° C, the cellulose added and the temperature maintained at less than 20° C during dissolution.

12. The process of claim 1 in which nitrosation and dissolution occurs at a temperature below 20° C.

* * * * *